US012333048B1

(12) United States Patent
Brady et al.

(10) Patent No.: US 12,333,048 B1
(45) Date of Patent: Jun. 17, 2025

(54) ACTIVE DATA DISPOSAL

(71) Applicant: FMR LLC, Boston, MA (US)

(72) Inventors: John Brady, Louisburg, NC (US); Susanne O'Neill, Loveland, OH (US); Matthew Gomez, Fort Worth, TX (US); Andrew J. McLellan, Cumberland, RI (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 18/817,890

(22) Filed: Aug. 28, 2024

(51) Int. Cl.
*G06F 21/62* (2013.01)
*G06F 16/23* (2019.01)
*G06F 21/00* (2013.01)
*G06F 21/60* (2013.01)

(52) U.S. Cl.
CPC .......... *G06F 21/6245* (2013.01); *G06F 16/23* (2019.01); *G06F 21/602* (2013.01)

(58) Field of Classification Search
CPC .... G06F 21/6245; G06F 21/60; G06F 21/602; G06F 21/62; G06F 21/71; G06F 21/78
See application file for complete search history.

(56) References Cited

U.S. PATENT DOCUMENTS

2016/0350173 A1\* 12/2016 Ahad ...................... H04L 67/02
2019/0036704 A1\* 1/2019 DeVetter ................... H04L 9/14

\* cited by examiner

*Primary Examiner* — Edward Zee
(74) *Attorney, Agent, or Firm* — Cesari and McKenna, LLP

(57) ABSTRACT

A computerized method is provided for automated deletion of data. Methods can include identification of personally identifiable information (PII) or other data that may be subject to regulation. Methods can include creating an encrypted record of deletion for future verification. In some embodiments, the record may include PII and the record may be encrypted via a one-way cryptographic hash such that foreknowledge of the PII is required to search the deletion record.

16 Claims, 4 Drawing Sheets

ACTIVE DATA DISPOSAL

TECHNICAL FIELD

This application relates generally to systems, methods, and apparatuses, including computer program products, for anonymization, archiving, and disposal of electronic data.

BACKGROUND

An overlapping patchwork of state, national, and international regulations currently govern storage and disposal of various electronic data. For example, data privacy regulations such as the California Privacy Rights Act, the EU's General Data Protection Regulation, and U.S. Health Insurance Portability and Accountability Act may all impact a company in possession of customer data depending on the location of the company, the location of the customer, the type of data, and/or the location in which the data is stored. Failure to comply with these various regulations can result in significant financial penalties. Accordingly, it is important that data custodians be aware of regulations and carefully manage compliance. Among certain regulations are provisions to delete user data in various circumstances including upon request. Regardless, due to the sensitive nature of personal data and the potential liabilities for mishandling that data or security breaches and leaks, it may be useful for a company to proactively delete personal client data at regular intervals when no longer being used.

SUMMARY

Systems and methods described herein provide for customizable and rules-based data deletion to minimize liability and aid in compliance with data privacy regulations. In various embodiments, systems and methods of the invention can provide a configurable interface where platform owners can connect to the environment so that their system can participate in the surveillance capability. The systems and methods described herein can be particularly useful in managing customer or user records containing personally identifiable information (PII) but, due to built-in flexibility in the platform, can be applied to any data or data type that can be defined by a set of customized rules. Through automated purging of expired data, custodians can lower the potential impact from data leaks or hacks; streamline record-keeping systems and ease cloud migration strategies; improve recovery time, scalability, and performance; and lower risk of regulatory fines.

A particular wrinkle associated with many data privacy regulations is the ability for customers or users, even at an individual level, to enquire about the retention and status of their personal data as well as allowing them to request deletion thereof. Accordingly, a data custodian may wish to create and maintain a record of deleted data in order to confirm to a user that, if personal data was previously held, it has been deleted. With respect to personal data, this can create an issue wherein the record of the deletion itself can run a risk of being considered personal data.

Systems and methods described herein can address that issue by creating and encrypting a unique identifier and fingerprint of personal data before deletion. That encryption can include a one-way cryptographic hash such that the true content of the fingerprint cannot be deciphered unless that content is already known. For example, the personal data to be deleted can include a social security number. That social security number may be included in a fingerprint of that data record and subjected to a one-way cryptographic hash after which the original data record can be permanently deleted and that deletion record associated and stored in a database along with the encrypted fingerprint. Should the individual associated with that personal information enquire about record deletion at a later date, they would have to submit their personal information including the social security number. Because the user was able to independently provide their personal information (e.g., social security number) that information can be entered into the one-way cryptographic hash again to derive the same encrypted fingerprint which can then be used to verify the deletion information for the original data record in the deletion database. Because there is no need to ever decipher the encrypted fingerprints without already possessing the content of the fingerprint, the encryption complexity and security can be maximized, thereby increasing compliance with various data privacy regulations.

Aspects of the invention can include a computerized method for active data disposal. Methods can include identifying a record to be deleted from a computer database, the record comprising personally identifiable information (PII) for an individual. Methods can further include creating a fingerprint of the record to be deleted, the fingerprint comprising at least one unique identifier associated with the individual; encrypting the fingerprint using a one-way cryptographic hash; storing the encrypted fingerprint in a deletion record database; and deleting the record from the computer database. In various embodiments, methods can include generating regulatory and/or internal reporting on disposal of the record for verification and compliance.

In some embodiments, the fingerprint can consist of a subset of data in the record to be deleted. The PII can comprise one or more of a name, a social security number, an address, an e-mail, or a phone number of the individual. The record may include financial services data comprising one or more of a client identifier, a plan identifier, and transactional information. In certain embodiments, the at least one unique identifier can comprise one or more of the social security number of the individual, the client identifier, and the plan identifier. The at least one unique identifier may consist of the social security number of the individual, the client identifier, and the plan identifier. The record to be deleted can consist of all data related to the individual stored within the computer database.

In various embodiments, the one-way cryptographic hash can comprise a secure hash algorithm (SHA). Storing the encrypted fingerprint may further comprise storing a deletion date on which the record was deleted. Methods may include confirming deletion of the record, wherein confirming deletion comprises: providing the at least one unique identifier associated with the individual; recreating the encrypted fingerprint using the at least one unique identifier and the one-way cryptographic hash; querying the deletion record database with the recreated encrypted fingerprint to locate the stored encrypted fingerprint; and confirming that the record was deleted on the deletion date. The confirming deletion step can be performed in response to receipt of an inquiry by the individual.

In certain aspects, systems of the invention can include a computer system for active data disposal. The system can include a processor in communication with a non-transient memory and operable to perform the steps of: identifying a record to be deleted from a computer database, the record comprising personally identifiable information (PII) for an individual; creating a fingerprint of the record to be deleted, the fingerprint comprising at least one unique identifier associated with the individual; encrypting the fingerprint using a one-way cryptographic hash; storing the encrypted fingerprint in a deletion record database; and deleting the record from the computer database.

In various embodiments systems of the invention can be operable to perform any and all of the aforementioned methods.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
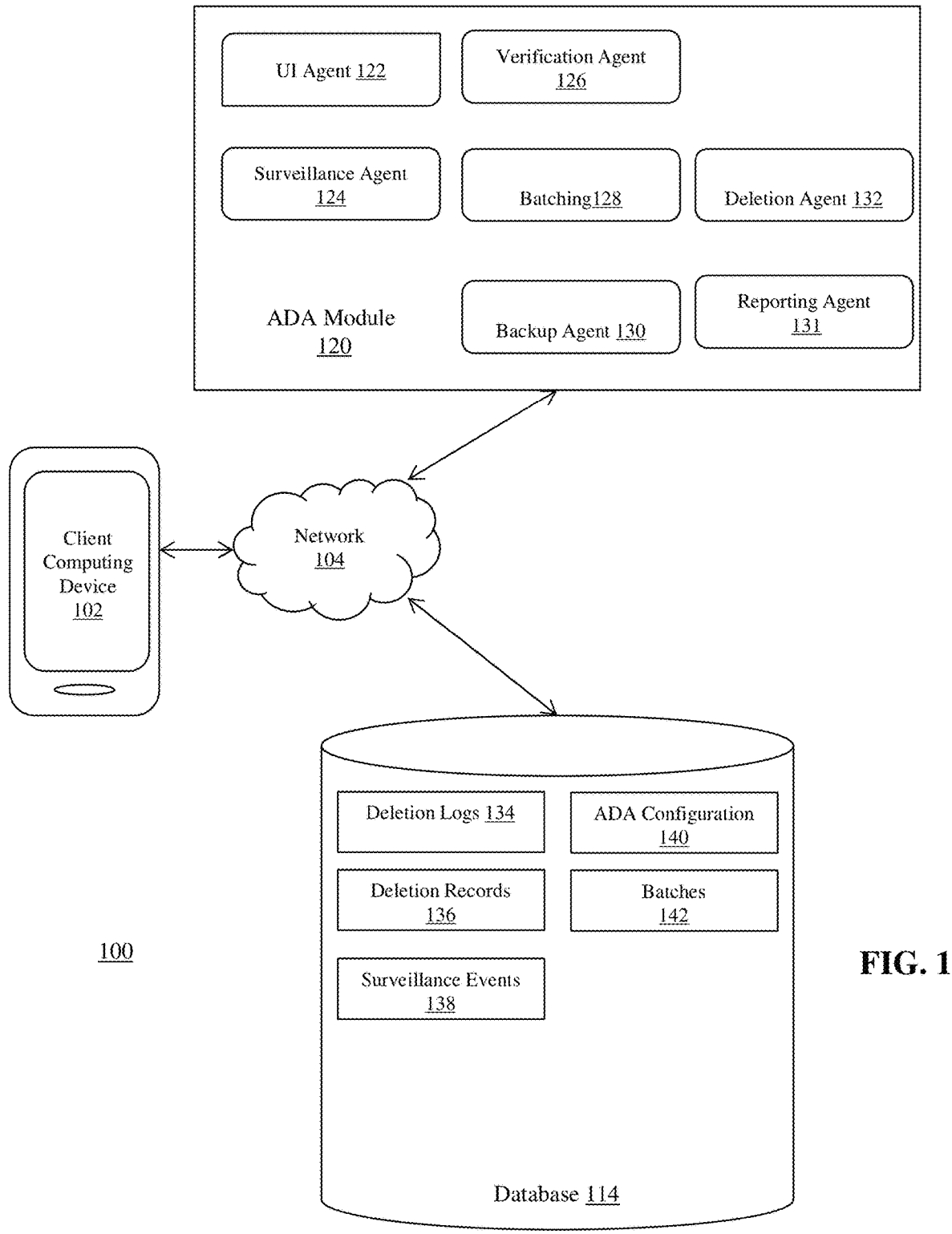
FIG. 1 is a block diagram of a system for active data disposal.

FIG. 1 is a block diagram of an exemplary system 100 for automated data disposal. The system 100 includes a client computing device 102, a communications network 104, an automated data disposal agent (ADA) module 120 that includes a user interface (UI) module through which a user or administrator can edit disposal criteria, schedules, or procedures, view reports, search deletion records and otherwise interact with the disposal agent; a surveillance agent 124 operable to monitor stored data and detect over-retained records or any records that meet the criteria stored in the system for determining candidate records for disposal. The surveillance agent 124 can tag candidate records or otherwise create a log noting candidate records eligible for deletion as well as recording information about those candidate records (e.g., unique identifying information such as PII or other portions of the record) in a deletion record 136. The ADA module 120 can also include a verification agent 126 operable to harvest and save data about deletions, run count checks, and verify accuracy and completeness of deletions. The verification agent 126 can further review the deletion records 136 and handle obfuscation of any sensitive data therein (e.g., encrypted fingerprints of PII as discussed below). The ADA module 120 can include a batching agent operable to create batches of candidate records for deletion based on batch criteria established by the system as well as a backup agent 130 operable to schedule backups for the deletion records. The ADA module 120 can further include a deletion agent 132 operable to identify, schedule, and execute deletions including communicating with downstream programs to handle deletion of downstream records. In certain embodiments, the ADA module 120 can include a reporting agent 131 operable to handle reporting of deletion for verification and/or compliance purposes. The reporting agent 131 can access the database 114 and generate internal or external communications including email or messaging confirming deletions. The deletions can be automatically confirmed to the requesting individual or entity or the relevant regulatory entities.

The client computing device 102 can allow for user interaction with the ADA module 120 via the UI agent 122 and connects to one or more communications networks (e.g., network 104) in order to communicate with the ADA module 120 to provide input and receive output relating.

Exemplary client computing devices 102 include but are not limited to server computing devices, desktop computers, laptop computers, tablets, mobile devices, smartphones, and the like. Typically, the client computing device 102 includes a display device (not shown) that is embedded in and/or coupled to the client computing device for the purpose of displaying information to a user of the device. It should be appreciated that other types of computing devices that are capable of connecting to the components of the system 100 can be used without departing from the scope of invention. Although FIG. 1 depicts one client computing device 102, it should be appreciated that the system 100 can include any number of client computing devices.

In some embodiments, the client computing device 102 can execute one or more software applications that are used to provide input to and receive output from the ADA module 120. For example, the client computing device 102 can be configured to execute one or more native applications and/or one or more browser applications. Generally, a native application is a software application (in some cases, called an 'app') that is installed locally on the client computing device 102 and written with programmatic code designed to interact with an operating system that is native to the client computing device 102. Such software may be available from, e.g., the Apple® App Store, the Google® Play Store, the Microsoft® Store, or other software download platforms depending upon, e.g., the type of device used. In some embodiments, the native application includes a software development kit (SDK) module that is executed by a processor of the client computing device 102 to perform functions (e.g., enter or approve time worked or request time off). Generally, a browser application comprises software executing on a processor of the client computing device 102 that enables the client computing device to communicate via HTTP or HTTPS with remote servers addressable with URLs (e.g., server computing device) to receive website-related content, including one or more webpages, for rendering in the browser application and presentation on the display device coupled to the client computing device 102. Exemplary mobile browser application software includes, but is not limited to, Firefox™, Chrome™, Safari™, and other similar software. The one or more webpages can comprise visual and audio content for display to and interaction with a user.

The communications network 104 enables the client computing device 102 to communicate with the ADA module and the database 114. The network 104 is typically comprised of one or more wide area networks, such as the Internet and/or a cellular network, and/or local area networks. In some embodiments, the network 104 is comprised of several discrete networks and/or sub-networks (e.g., cellular to Internet).

The ADA module can be hosted in virtual machines, serverless environments, on a server computing device, or any other known computing medium. A server computing device is a device including specialized hardware and/or software modules that execute on a processor and interact with memory modules of the server computing device, to receive data from other components of the system 100, transmit data to other components of the system 100, and perform functions (e.g., time entry, scheduling, and payroll management as discussed above). In some embodiments, the modules such as the ADA module 120 may be specialized sets of computer software instructions programmed onto one or more dedicated processors in the server computing device and can include specifically designated memory locations and/or registers for executing the specialized computer software instructions.

In some embodiments the functionality of computing modules and agents can be distributed among a plurality of server computing devices. It should be appreciated that any number of computing devices, arranged in a variety of architectures, resources, and configurations (e.g., cluster computing, virtual computing, cloud computing) can be used without departing from the scope of the invention.

The database 114 is a computing device (or in some embodiments, a set of computing devices) in communication with the ADA module 120 and the client computing device 102 and is configured to receive, generate, and store specific segments of data relating to automated data disposal. In some embodiments, all or a portion of the database 114 can be integrated with a server computing device or be located on a separate computing device or devices. The database 114 can comprise one or more databases configured to store portions of data used by the other components of the system 100, as will be described in greater detail below.

In some embodiments, the database 114 comprises deletion logs 134, deletion records 136, surveillance events 138, ADA configuration information 140, and batch information 142. Deletion logs 134 can include temporary information relating to deletion jobs while the deletion records 136 can include the final listing of deletion information, for example including deletion time, deletion parameters, and a unique identifier for each deleted record. In various embodiments, the unique identifier can be an encrypted fingerprint where the original information contains PII or other information the custodian wishes to obfuscate.

Data disposal is the broad term used to describe the different solutions businesses can implement to dispose of their data. These methods are typically based on several requirements including legal & regulatory, retention policies, consumer rights or business drivers. Different data disposal methodologies can include de-identification, deletion, aggregation, and archiving which can be categorized as transactional, operational, and/or analytical in their application. De-identification of data is the act of permanently and irreversibly changing its value to prevent re-identification. Once data has been de-identified it cannot be traced back to an individual or organization. De-identified data can be maintained at any level of detail. Deletion is the physical removal and destruction of data so that it is no longer recoverable. Data cannot be recovered by any means once deleted. Deleted data no longer has any regulatory, business or retention requirements.

Aggregation is the act of summarizing data that relates to a group or category of individuals. Individual identities have been removed in such a way that it is irreversible (i.e., there are no reasonable means to tie the data back to an individual). In some cases a custodian may be required to permanently store data (e.g., fiduciary responsibility of a transfer agent, etc.) which can call for archiving of data. In such instances, data can be removed from all databases and cannot be accessed by any system but the data can still be stored in immutable media for retention purposes.

Systems and methods of the invention can be used for automated data disposal, allowing users any combination of the following capabilities: surveillance, audit record retention, selective backup/restore, disposal, post-disposal verifications, reporting & alerting, inquiry against disposed records & disposal events. In certain embodiments, an active disposal agent can perform the following functions:

1) Identification: wherein the system locates and identifies over-retained records.
2) Reporting/Alerting: wherein the system identifies and reports disposal burn-down and publish events.
3) Back Up: wherein the system schedules backup within a system of record (SOR) for disposal record populations.
4) Disposal: wherein the system schedules disposal within the SOR for disposal record populations.
5) Verification: wherein the system inquires of data sources (EDL, SOR, or both) to verify the removal has taken place at the record level of granularity,
6) Record: wherein the system records the lifecycle for steps 1-5. This record can be retained as long as necessary.
7) Assist a Restore: wherein the system can aid in data restoration if disposal has caused an unforeseen problem.
8) Prevent Rehydration: wherein the system can allow inquiry against disposed records to assist systems to prevent re-entry of disposed records.

In certain embodiments, automated data disposal systems and methods can operate in bulk deletion modes. For bulk deletions, an administrator can approve a bulk deletion and its parameters. The population for bulk deletion can then be tagged and the tagged data can be previewed to de-risk undesired data loss. The data can then be backed up as appropriate. The data can then be deleted which can then be summarized in a deletion report. Data can be selected for automated deletion based on overall age, occurrence of a set event (e.g., a customer closing an account), time passed since a selected event (e.g., a number of months or years since a customer has closed an account), specific individual requests for deletion, or other criteria such as those mandated by new or existing regulations.

Figure 2:
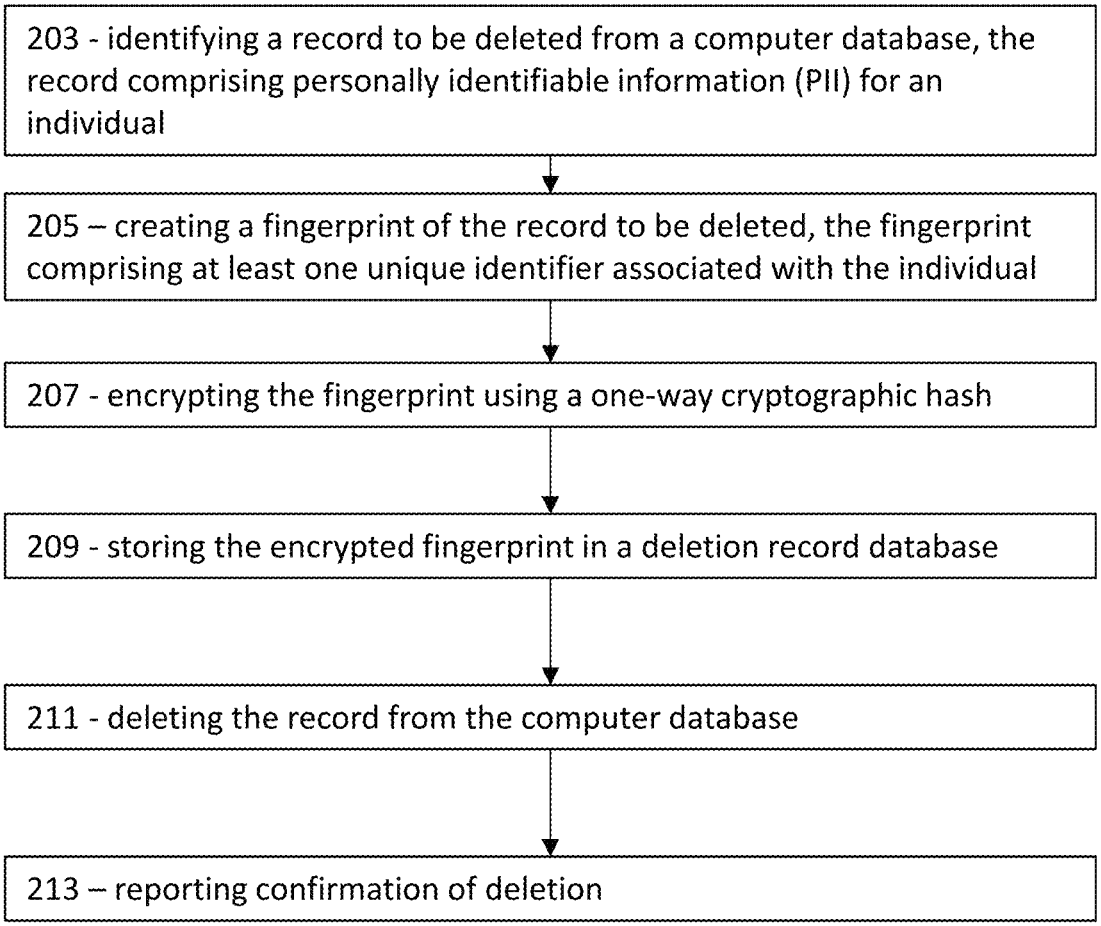
FIG. 2 shows an exemplary method for active data disposal.

FIG. 2 shows an exemplary method 201 for active data disposal. A computer system can identify 203 stored record (s) to be deleted from a computer database. The stored record(s) may include personally identifiable information (PII) such as personal health or financial information. While described herein with respect to PII, the methods herein can be applied to any type of data wherein permanent deletion is desired but the ability to subsequently identify/confirm that the specific data was deleted is required. Once the record has been identified 203, a fingerprint of the record to be deleted can be created 205. The fingerprint should include at least one unique identifier associated with the record or, in the case of PH, the individual to which the record pertains. In various embodiments, the fingerprint may include a series of unique identifiers or may consist of a minimum amount of information to allow unique identification of a specific individual/record. The fingerprint can then be encrypted 20 using a one-way cryptographic hash. The encrypted fingerprint can then be stored 209 in a deletion record database and the record can then be deleted 211 from the computer database. In various embodiments, methods can include generating and/or sending reports confirming successful deletion of records (reporting 213). Reports may be sent to requesting individuals or entities and regulatory authorities where desired or required and may be automatically completed based on templates to comply with reporting requirements.

In various embodiments, the fingerprint can consist of a unique, newly assigned number or other identifier or may include the data in the record to be deleted or a subset thereof. In certain embodiments, the fingerprint can include the PII or portions thereof and may be truncated and/or arranged in a predetermined order (e.g., removing spaces or extraneous characters). The PII can include one or more of a name, a social security number, an address, an e-mail, or a phone number of the individual.

In exemplary embodiments, the record may include financial services data comprising a client identifier, a plan identifier, and a social security number for the client. For example, Bob Kent may be a financial services client with the client number 899 participating in company plan number 1222 and having a social security number of 333-33-3333. Upon being selected for deletion, the presence of PII may be noted, the social security number in this case. Because no two individuals or, therefore, records will have the same client number, plan number, and social security number, that data can be leveraged to create a unique fingerprint. For example, the numbers can be combined and any spaces removed to create a fingerprint of 8991222333333333. That fingerprint can then be subjected to a one-way cryptographic hash to render an output of, for example, jYOHR&*OYGHJ (*GTRD. The rules for the cryptographic hash can be complicated enough to render deciphering or decoding practically impossible. The rules may be input dependent such that deciphering is impossible without foreknowledge of the encrypted data.

Exemplary one-way cryptographic hashes can include a secure hash algorithm (SHA). Secure Hash Algorithms are a family of cryptographic functions that transform data using a hash function consisting of bitwise operations, modular additions, and compression functions. The hash function then produces a fixed-size string that looks nothing like the original. These algorithms are designed to be one-way functions, meaning that once they are transformed into their respective hash values, it is virtually impossible to transform them back into the original data.

Once it has been created, the encrypted fingerprint can be stored along with pertinent deletion information (e.g., deletion date and the policy parameters leading to deletion) in a durable data store with minimal risk of running afoul of data privacy regulations. Even in the event of a data breach, the deletion records contain only the encrypted fingerprints and would not be decipherable.

In the future, should an individual request confirmation of record deletion, they would have to provide the unique identifier information used in the original fingerprint. In the example above, Bob Kent might contact the financial services company to request confirmation of record deletion. He would provide his client and plan numbers along with his social security number. From this information, the custodian could recreate the fingerprint, subject it to the same cryptographic hash, and receive the same output as before, jYOHR&*OYGHJ(*GTRD. That encrypted fingerprint could then be used to search the deletion record database which would return the deletion date any other relevant information associated with the deleted record.

Figure 3:
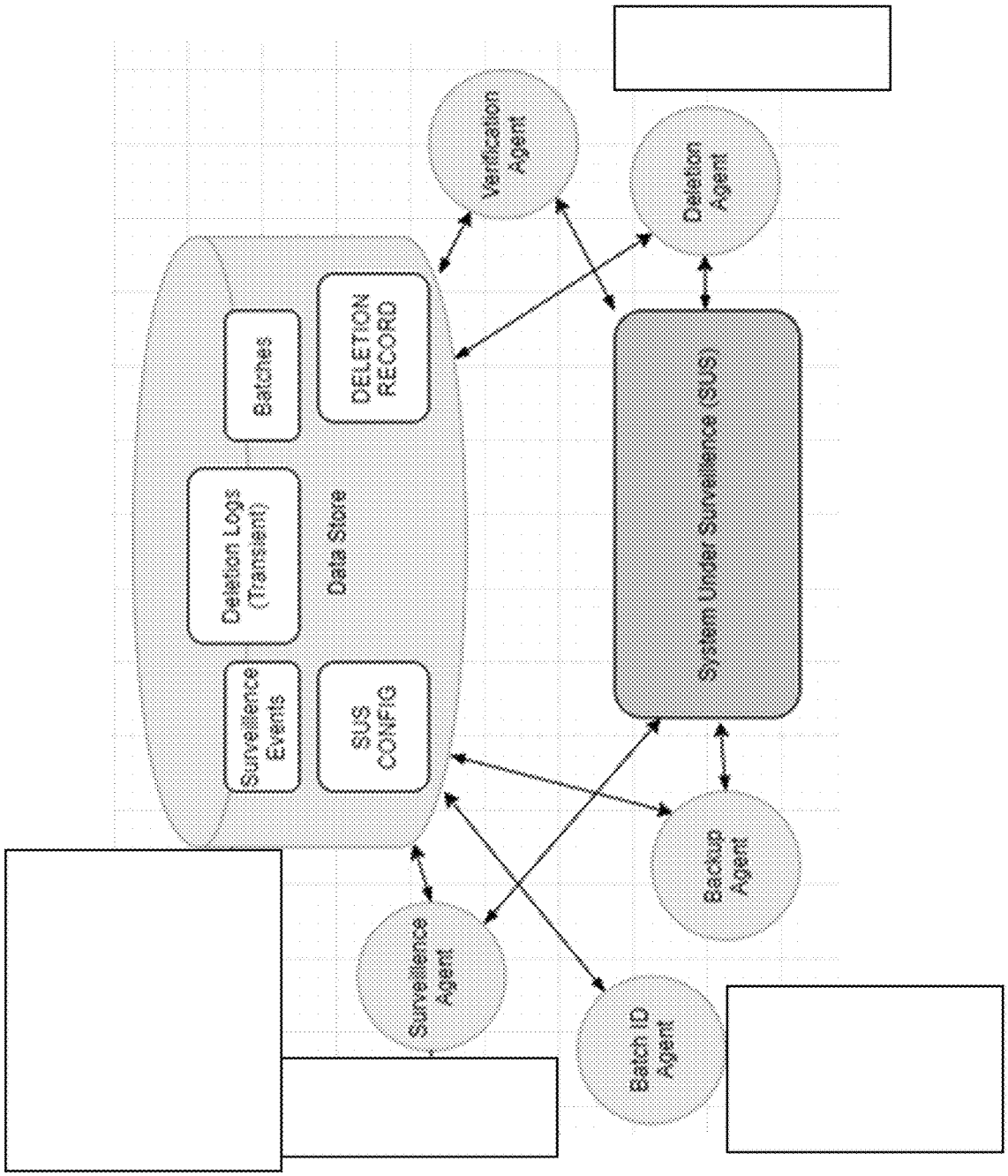
FIG. 3 shows an exemplary computer system configuration for data disposal management.

FIG. 3 shows an exemplary computer system configuration for data disposal management. The system can consist of a data store, a system under surveillance (SUS) module, a surveillance agent, a batch ID agent, a backup agent, a deletion agent, and a verification agent. The data store can hold records of surveillance events, SUS configuration files, transient deletion logs, batch information, and long-term deletion records. The SUS module can be configured with the system parameters by an administrator via a user interface. Using the SUS module configuration, the surveillance agent can detect over-retained data, records, and/or related metadata based on definitions entered in the configuration of the SUS module. The surveillance agent can catalog detected over-retained data by recording metadata information about them in the deletion record that can then be used by the batch ID agent to create batches for deletion. Based on the SUS configuration, including, for example, settings such as batch size and makeup, the batch ID agent can identify reasonable batches to perform deletions on. The backup agent can then schedule a backup to be held in the deletion record. In various embodiments, this backup and deletion record can consist of the encrypted data fingerprints as discussed above. The Backup agent can also notify the SUS module when the disposal driven backups should be removed. The deletion agent can then identify all qualified records for deletion in a batch and schedule a deletion. The verification agent can then harvest data about deletions and record it in the deletion record. The verification agent can also run count checks and verify accuracy and completeness of the deletions. In certain embodiments, sensitive information such as PII can be retained during the deletion process such that any such data is concentrated in the deletion record. The verification agent can periodically identify the presence of any such data in the deletion record and subject it to permanent obfuscation (e.g., encrypted fingerprinting) as discussed above.

Figure 4:
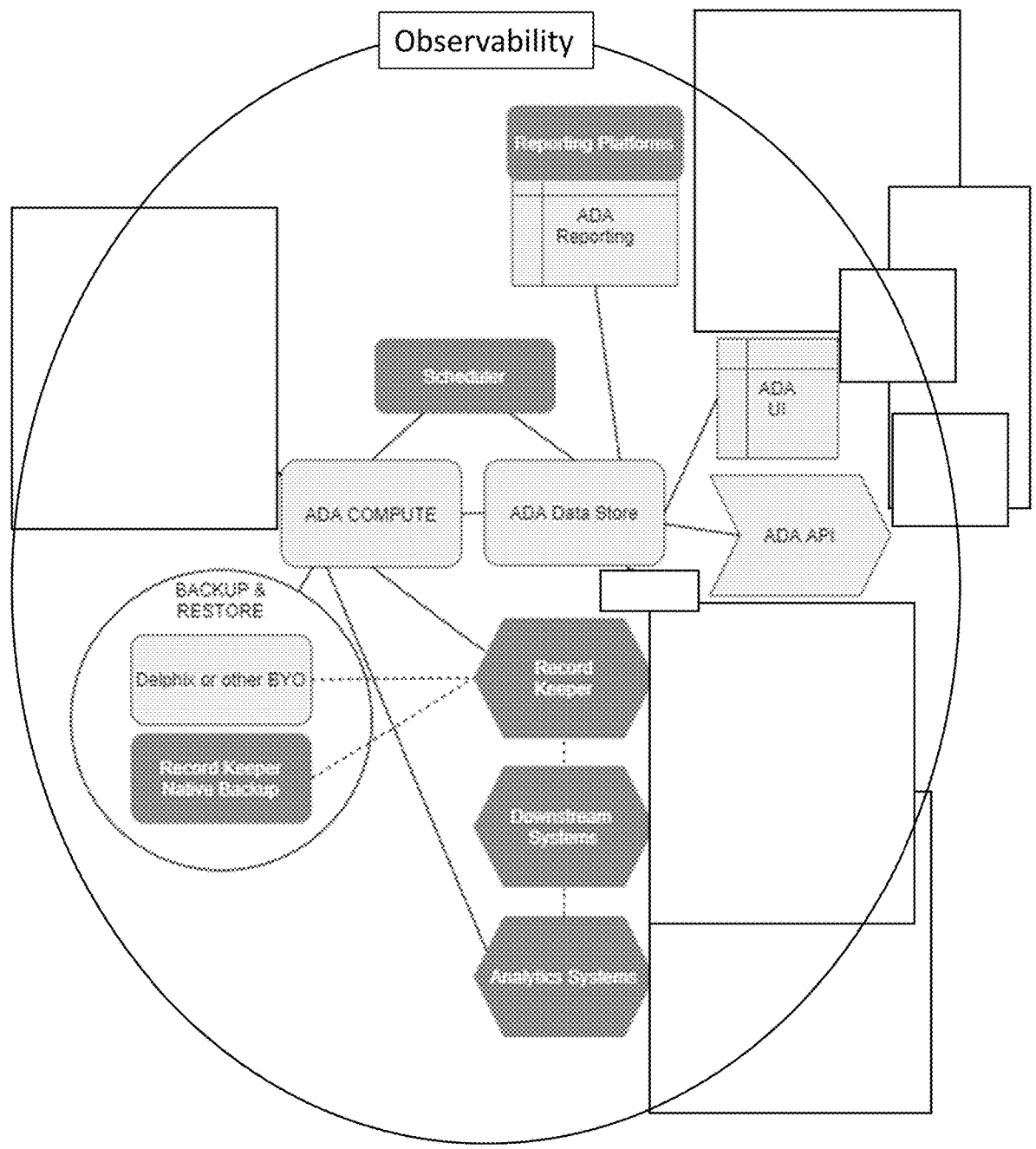
FIG. 4 shows an exemplary system for automated data disposal.

FIG. 4 shows an exemplary system for automated data disposal. The system can leverage common platforms and modules to assist in many disposal functions. For example, reporting platforms, schedulers, and record keeping modules are well known and available in stand-alone programs or as services in server-based, serverless, cloud-based, or on-demand computing environments. To these existing elements, various automated data disposal agent (ADA) modules can be added or adapted. For example, as shown in FIG. 4, an ADA reporting module can leverage existing reporting platforms for reporting aggregation computing, record disposal burn down, disposal forward looks, and error rates. An ADA user interface (UP) can allow for self-service requests for disposals, information entry for disposal records, and management of product/system configurations. An ADA application programming interface (API) can be used to query the status of disposals, query the prior disposal of a record to help a consumer prevent re-hydration of records, or push events and/or data where needed. An ADA data store can serve as a long term durable store for key disposal data such as minimal remnants of original records, metadata describing disposal events and tranches, and metadata describing current disposal requirements and/or prior disposal requirements associated with prior disposal events. An ADA compute module can serve as a container for any required computing and may store its results in the ADA data store. The ADA compute module can also raise alerts or post messages or events. For example, the ADA compute module can audit or detect if re-hydration of a disposed record has occurred or can identify emerging disposal candidate records. The system can communicate with downstream systems and analytics systems to ensure removal of target data from those systems as well. For downstream systems, the removal approach can be multi-faceted including both natural removal and explicit removal. Approaches to removal of data from analytical systems can be different from systems of record. Records may exist in analytical systems in an expired state after they have been deleted from their system of origin.

The above-described techniques can be implemented in digital and/or analog electronic circuitry, or in computer hardware, firmware, software, or in combinations of them. The implementation can be as a computer program product, i.e., a computer program tangibly embodied in a machinereadable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile computing device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile computing device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A computerized method for active data disposal, the method comprising:
    identifying a record to be deleted from a computer database, the record comprising personally identifiable information (PII) for an individual;
    creating a fingerprint of the record to be deleted, the fingerprint comprising at least one unique identifier associated with the individual;
    encrypting the fingerprint using a one-way cryptographic hash;
    storing the encrypted fingerprint and a deletion date on which the record was deleted in a deletion record database;
    deleting the record from the computer database, and
    confirming deletion of the record, wherein confirming deletion comprises:
        providing the at least one unique identifier associated with the individual;
        recreating the encrypted fingerprint using the at least one unique identifier and the one-way cryptographic hash;
        querying the deletion record database with the recreated encrypted fingerprint to locate the stored encrypted fingerprint; and
        confirming that the record was deleted on the deletion date.

2. The computerized method of claim 1, wherein the fingerprint consists of a subset of data in the record to be deleted.

3. The computerized method of claim 2, wherein the PII comprises one or more of a name, a social security number, an address, an e-mail, or a phone number of the individual.

4. The computerized method of claim 3, wherein the record comprises financial services data comprising one or more of a client identifier, a plan identifier, and transactional information.

5. The computerized method of claim 4, wherein the at least one unique identifier comprises one or more of the social security number of the individual, the client identifier, and the plan identifier.

6. The computerized method of claim 5, wherein the at least one unique identifier consists of the social security number of the individual, the client identifier, and the plan identifier.

7. The computerized method of claim 1, wherein the record to be deleted consists of all data related to the individual stored within the computer database.

8. The computerized method of claim 1, wherein the one-way cryptographic hash comprises secure hash algorithm (SHA).

9. The computerized method of claim 1, wherein the confirming deletion step is performed in response to receipt of an inquiry by the individual.

10. A computer system for active data disposal, the system comprising a processor in communication with a non-transient memory and operable to perform the steps of:
    identifying a record to be deleted from a computer database, the record comprising personally identifiable information (PII) for an individual;
    creating a fingerprint of the record to be deleted, the fingerprint comprising at least one unique identifier associated with the individual;
    encrypting the fingerprint using a one-way cryptographic hash;
    storing the encrypted fingerprint and a deletion date on which the record was deleted in a deletion record database;
    deleting the record from the computer database, and
    confirming deletion of the record, wherein confirming deletion comprises:
        providing the at least one unique identifier associated with the individual;
        recreating the encrypted fingerprint using the at least one unique identifier and the one-way cryptographic hash;
        querying the deletion record database with the recreated encrypted fingerprint to locate the stored encrypted fingerprint; and
        confirming that the record was deleted on the deletion date.

11. The computer system of claim 10, wherein the fingerprint consists of a subset of data in the record to be deleted.

12. The computer system of claim 11, wherein the PII comprises one or more of a name, a social security number, an address, an e-mail, or a phone number of the individual.

13. The computer system of claim 12, wherein the record comprises financial services data comprising one or more of a client identifier, a plan identifier, and transactional information.

14. The computer system of claim 13, wherein the at least one unique identifier comprises one or more of the social security number of the individual, the client identifier, and the plan identifier.

15. The computer system of claim 14, wherein the at least one unique identifier consists of the social security number of the individual, the client identifier, and the plan identifier.

16. The computer system of claim 10, wherein the record to be deleted consists of all data related to the individual stored within the computer database.

* * * * *